United States Patent [19]

Hu

[11] Patent Number: 5,767,867
[45] Date of Patent: Jun. 16, 1998

US005767867A

[54] METHOD FOR ALPHA BLENDING IMAGES UTILIZING A VISUAL INSTRUCTION SET

[75] Inventor: Xiao Ping Hu, Mountain View, Calif.

[73] Assignee: Sun Microsystems, Inc., Palo Alto, Calif.

[21] Appl. No.: 563,033

[22] Filed: Nov. 27, 1995

[51] Int. Cl.$^6$ .................................................. G06F 13/00
[52] U.S. Cl. .......................... 345/524; 345/511; 345/515
[58] Field of Search ............................. 395/523, 524, 395/501, 508, 511, 515, 122; 345/191, 190, 201, 422, 501, 508, 511, 515, 523, 524

[56] References Cited

U.S. PATENT DOCUMENTS 5,185,856  2/1993  Alcorn et al. ........................... 395/524
5,268,995  12/1993  Dielendorff et al. ..................... 395/501
5,533,185  7/1996  Lentz et al. ........................... 395/524

OTHER PUBLICATIONS

Motorola, "MC88110 User's Manual, 2nd Generation RISC Microprocessor", 1991, Section 1, pp. 1–1 to 1–24; section 3, pp. 3–1 to 3–32; Section 5, pp. 5–1 to 5–26.

*Primary Examiner*—Kee M. Tung
*Attorney, Agent, or Firm*—Townsend and Townsend and Crew, LLP

[57] ABSTRACT

An image alpha blending method utilizing a parallel processor is provided. The computer-implemented method includes the steps of loading unaligned multiple word components into a processor in one machine instruction, each word component associated with a pixel of an image; alpha blending the multiple word components of different source images and a control image in parallel; and storing the alpha blended multiple word components of a destination image into memory in parallel.

8 Claims, 9 Drawing Sheets

SRC 2

SRC 1 fexpand (read_hi (db_S1))

read_hi (dbl-S1) = |B0|B1|B2|B3|

|←—16—→| fsub 16(dbl_S2_e,dbl_S1_e)

-dbl_S1_e= |0000B0000|0000B10000|···|0000B40000| dbl_S2_e= |0000B'0000|0000B1'0000|···|0000B4'0000|

|←—16—→|←—16—→| dbl_tmp_2= |0000(B0'-B0)0000|0000(B1-B1')0000|···

$B_d0$  $B_d1$ fmul.8x16(read_hi(quada),dbl_tmp2)

read_hi(quada) = |$B_a0$|$B_a1$|$B_a2$|$B_a3$| dbl_tmp_1|0000($B_a0$x$B_d0$)|0000($B_a1$x$B_d1$)|··· fpadd(dbl_s_e, dbl_tmp_1)

|0000($B_a0$x$B_d0$)|0000($B_a1$x$B_d1$)|
+(B00000      |  +(B00000     |  ··· dbl_sum_1= |0000S0|0000S1| f pack 16(dbl_sum_1)

dest(hi) > |S0|S1|S2|S3|

FIG. 10.

METHOD FOR ALPHA BLENDING IMAGES UTILIZING A VISUAL INSTRUCTION SET

COPYRIGHT NOTICE

A portion of the disclosure of this patent document contains material which is subject to copyright protection. The copyright owner has no objection to the xeroxographic reproduction by anyone of the patent document or the patent disclosure in exactly the form it appears in the Patent and Trademark Office patent file or records, but otherwise reserves all copyright rights whatsoever.

RELATED APPLICATIONS

The present invention is related to U.S. patent application No. 08/236,572 by Van Hook et al., filed Apr. 29, 1994, entitled "A Central Processing Unit with Integrated Graphics Functions," as well as U.S. patent application No. 08/398,111 (Atty Dckt No. P-1867) by Chang-Guo Zhou et al., filed Mar. 3, 1995, entitled "Color Format Conversion in a Parallel Processor," both of which are incorporated in their entirety herein by reference for all purposes.

BACKGROUND OF THE INVENTION

1. Field of the Invention

The present invention relates generally to image processing and more particularly to blending two images to form a destination image.

2. Description of the Relevant Art

One of the first uses of computers was the repetitious calculations of mathematical equations. Even the earliest of computers surpassed their creators in their ability to accurately and quickly process data. It is this processing power that make computers very well suited for tasks such as digital image processing.

A digital image is an image where the pixels are expressed in digital values. These images may be generated from any number of sources including scanners, medical equipment, graphics programs, and the like. Additionally, a digital image may be generated from an analog image. Typically, a digital image is composed of rows and columns of pixels. In the simplest gray-scale images, each pixel is represented by a luminance (or intensity) value. For example, each pixel may be represented by a single unsigned byte with a range of 0-255, where 0 specifies the darkest pixel, 255 specifies the brightest pixel and the other values specify an intermediate luminance.

However, images may also be more complex with each pixel being an almost infinite number of chrominances (or colors) and luminances. For example, each pixel may be represented by four bands corresponding to R, G, B, and α. As is readily apparent, the increase in the number of bands has a proportional impact on the number of operations necessary to manipulate each pixel, and therefore the image.

Blending two images to form a resulting image is a function provided by many image processing libraries, for example the XIL imaging library developed by SunSoft division of Sun MicroSystems, Inc. and included in Solaris operating system.

An example of image blending will now be described with reference to FIGS. 8A–D. In the simplest example, the two source images (src1 and src2) are blended to form a destination image (d). The blending is controlled by a control image (a) the function of which is described below. All images are 1000×600 pixels and src1, src2, and d are one banded grey-scale images.

Referring to FIGS. 8A–D, the src2, src1, destination, and control images are respectively depicted where src1 is a car on a road, src2 is a mountain scene, and d is the car superimposed on the mountain scene. Each pixel in the d image is computed from corresponding pixels in the src1, src2, dst images according to the following formula:

$$dst = a*src1 + (1-a)*src2 \qquad \text{Eq. 1}$$

where a is either 0, 1, or a fraction. The a values are derived from pixels in the control image which correspond to pixels in src1 and src2. Thus, the calculations of Eq. 2 must be performed for each pixel in the destination image.

Thus, referring to FIGS. 8A–D, the values of all pixels in the control image corresponding to the pixels in src1 representing the car is "1" and the value of all pixels in the control image outside the car is "0". Thus, according to Eq. 1, the pixels' values in the destination image corresponding to the "1" pixels in the control image would be represent the car and the pixels in the destination image corresponding to the "0" pixels in the control image would represent the mountain scene. In practice, the pixel values near the edge of the car would have fractional values to make the edge formed by the car and the mountain scene appear realistic.

While the alpha blending function is provided by existing image libraries, typically the function is executed on a processor having integer and floating point units and utilizes generalized instructions for performing operations utilizing those processors.

However, certain problems associated with alpha blending operations can cause the blending to be slow and inefficient when performed utilizing generalized instructions. In particular, most processors have a memory interface designed to access words aligned along word boundaries. For example, if the word is a byte (8 bits) then bytes are transferred between memory and the processor beginning at address 0 so that all addresses must be divisible by 8. However, image data tends to be misaligned, i.e., does not begin or end on aligned byte addresses, due to many factors including multiple bands. Further, words containing multiple bytes are usually transferred between memory and the processor and standard methods do not take advantage of the inherent parallelism due to the presence of multiple pixels in the registers.

Known image blending techniques basically loop through the image and processing each pixel in sequence. This is a very simple process but for a moderately complex 3000×4000 pixel image, the computer may have to perform 192 million instructions or more. This estimation assumes an image of 3000×4000 pixels, each pixel being represented by four bands and four instructions to process each value or band. This calculation shows that what appears to be a simple process quickly becomes very computationaly expensive and time consuming.

As the resolution and size of images increases, improved systems and methods are needed that increase the speed with which computers may blend images. The present invention fulfills this and other needs.

SUMMARY OF THE INVENTION

The present invention provides innovative systems and methods of blending digital images. The present invention utilizes two levels of concurrency to increase the efficiency of image alpha blending. At a first level, machine instructions that are able to process multiple data values in parallel are utilized. At another level, the machine instructions are performed within the microprocessor concurrently. The present invention provides substantial performance increases in image alpha blending technology.

According to one aspect of the invention, an image alpha blending method of the present operations in a computer system and includes the steps of loading multiple word components of an unaligned image into a microprocessor in parallel, each word component associated with a pixel of an image; alpha blending the multiple word components in parallel; and storing the unaligned multiple word components of a destination image into memory in parallel.

According to another aspect of the invention, a computer program product included a computer usable medium having computer readable code embodied therein for causing loading multiple word components of an unaligned image into a microprocessor in parallel, each word component associated with a pixel of an image; alpha blending the multiple word components in parallel; and storing the unaligned multiple word components of a destination image into memory in parallel Other features and advantages of the present invention will become apparent upon a perusal of the remaining portions of the specification and drawings.

BRIEF DESCRIPTION OF THE DRAWINGS

FIG. 10 is depiction of the modification of word components effected by the steps in a routine for calculating the destination image.

DESCRIPTION OF THE PREFERRED EMBODIMENT

The following are definitions of some of the terms used herein.

Pixel (picture element)—a small section or spot in an image where the image is on a computer screen, paper, film, memory, or the like.

Byte—a unit of information having 8 bits.

Word—a unit of information that is typically a 16, 32 or 64-bit quantity.

Machine instructions (or code)—binary sequences that are loaded and executed by a microprocessor.

In the description that follows, the present invention will be described with reference to a Sun workstation incorporating an UltraSPARC-I microprocessor and running under the Solaris operating system. The UltraSPARC-I is a highly integrated superscaler 64-bit processor and includes the ability to perform multiple partitioned integer arithmetic operations concurrently. The UltraSPARC-I microprocessor will be described below but is also described in U.S. application No. 08/236,572 by Van Hook et al. filed Apr. 29, 1994, entitled "A Central Processing Unit with Integrated Graphics Functions," which is hereby incorporated by reference for all purposes. The present invention, however, is not limited to any particular computer architecture or operating system. Therefore, the description the embodiments that follow is for purposes of illustration and not limitation.

Figure 1:
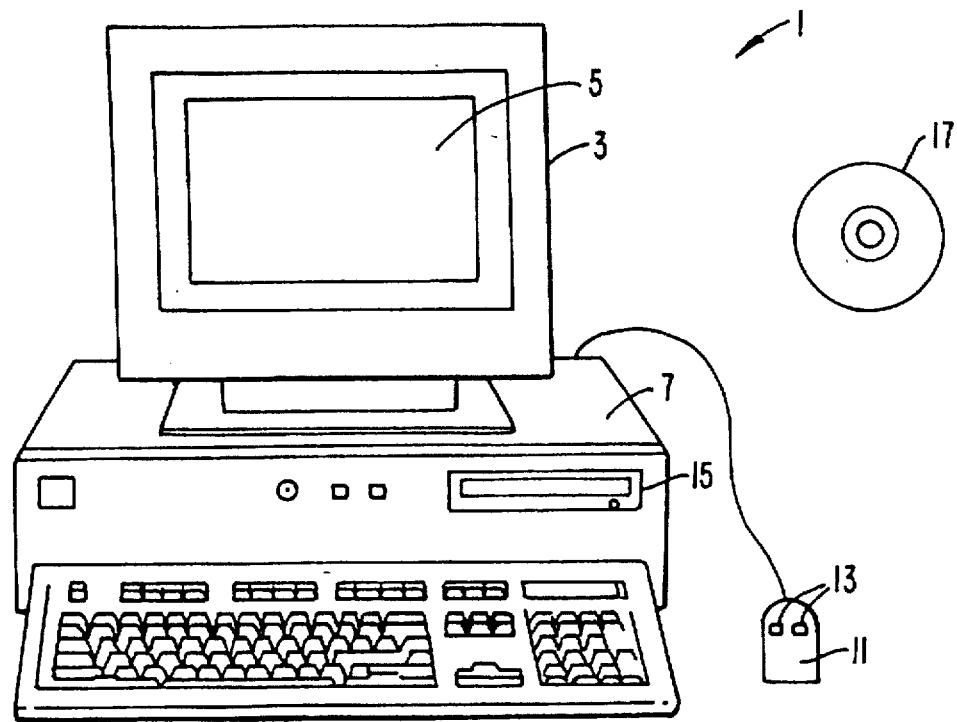
FIG. 1 illustrates an example of a computer system used to execute the software of the present invention.

FIG. 1 illustrates an example of a computer system used to execute the software of the present invention. FIG. 1 shows a computer system 1 which includes a monitor 3, screen 5, cabinet 7, keyboard 9, and mouse 11. Mouse 11 may have one or more buttons such as mouse buttons 13. Cabinet 7 houses a CD-ROM drive 15 or a hard drive (not shown) which may be utilized to store and retrieve software programs incorporating the present invention, digital images for use with the present invention, and the like. Although a CD-ROM 17 is shown as the removable media, other removable tangible media including floppy disks, tape, and flash memory may be utilized. Cabinet 7 also houses familiar computer components (not shown) such as a processor, memory, and the like.

Figure 2:
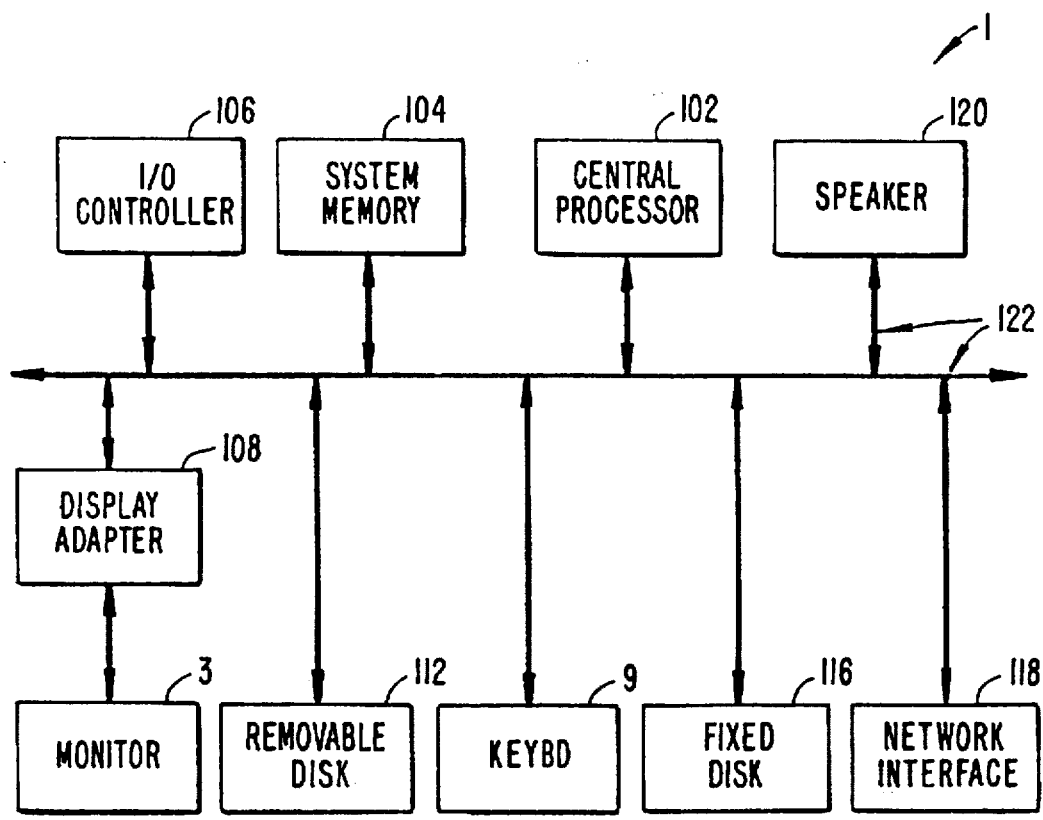
FIG. 2 shows a system block diagram of a typical computer system used to execute the software of the present invention.

FIG. 2 shows a system block diagram of computer system 1 used to execute the software of the present invention. As in FIG. 1, computer system 1 includes monitor 3 and keyboard 9. Computer system 1 further includes subsystems such as a central processor 102, system memory 104, I/O controller 106, display adapter 108, removable disk 112, fixed disk 116, network interface 118, and speaker 120. Other computer systems suitable for use with the present invention may include additional or fewer subsystems. For example, another computer system could include more than one processor 102 (i.e., a multi-processor system) or a cache memory.

Arrows such as 122 represent the system bus architecture of computer system 1. However, these arrows are illustrative of any interconnection scheme serving to link the subsystems. For example, a local bus could be utilized to connect the central processor to the system memory and display adapter. Computer system 1 shown in FIG. 2 is but an example of a computer system suitable for use with the present invention. Other configurations of subsystems suitable for use with the present invention will be readily apparent to one of ordinary skill in the art.

Figure 3:
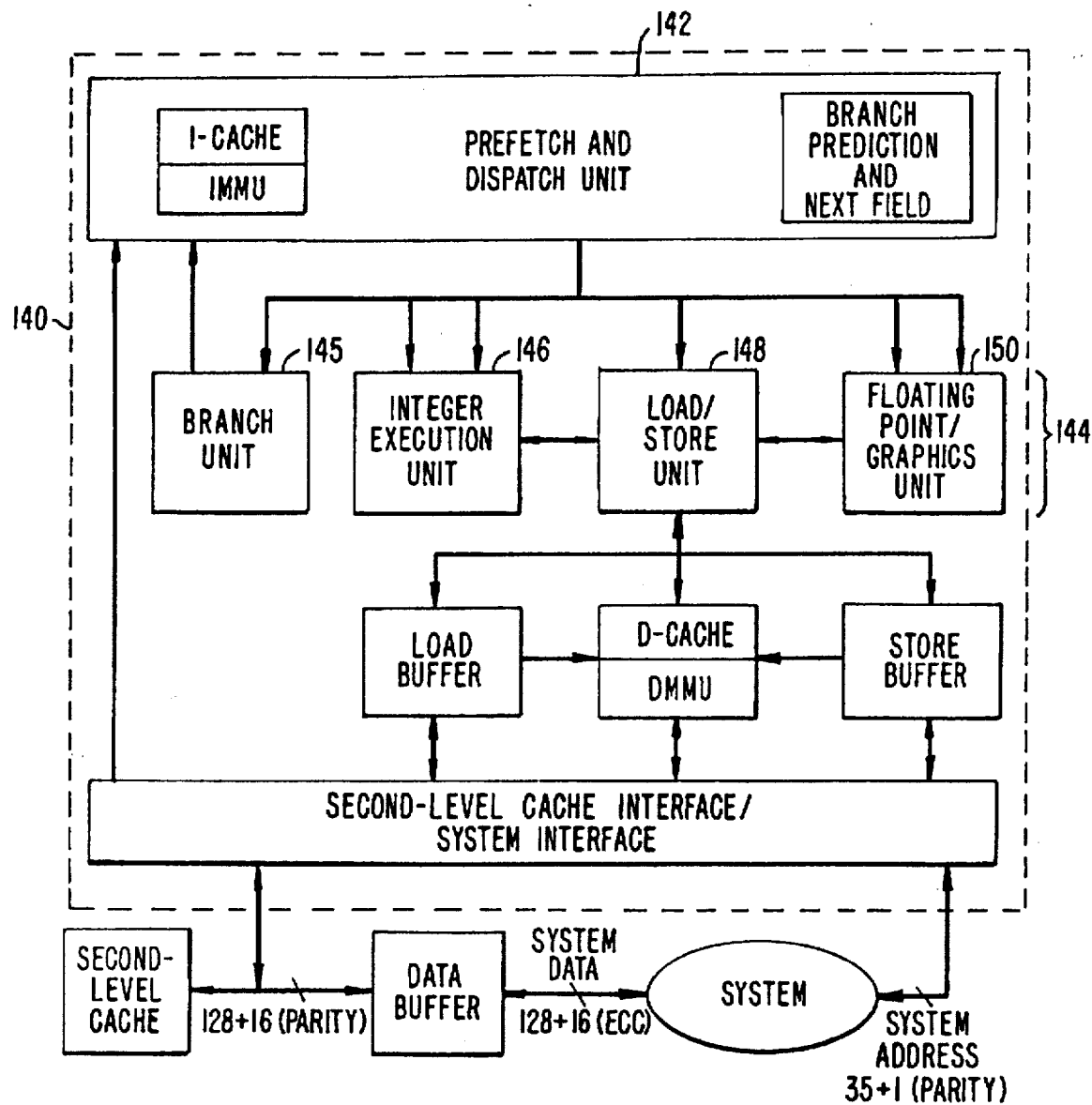
FIG. 3 is a block diagram of the major functional units in the UltraSPARC-I microprocessor.

FIG. 3 is a block diagram of the major functional units in the UltraSPARC-I microprocessor. A microprocessor 140 includes a front end Prefetch and Dispatch Unit (PDU) 142. The PDU prefetches instructions based upon a dynamic branch prediction mechanism and a next field address which allows single cycle branch following. Typically, branch prediction is better than 90% accurate which allows the PDU to supply four instructions per cycle to a core execution block 144.

The core execution block includes a Branch Unit 145, an Integer Execution Unit (IEU) 146, a Load/Store Unit (LSU) 148, and a Floating Point/Graphics Unit (FGU) 150. The units that make up the core execution block may operate in parallel (up to four instructions per cycle) which substantially enhances the throughput of the microprocessor. The IEU performs the integer arithmetic or logical operations. The LSU executes the instructions that transfer data between the memory hierarchy and register files in the IEU and FGU. The FGU performs floating point and graphics operations.

Figure 4:
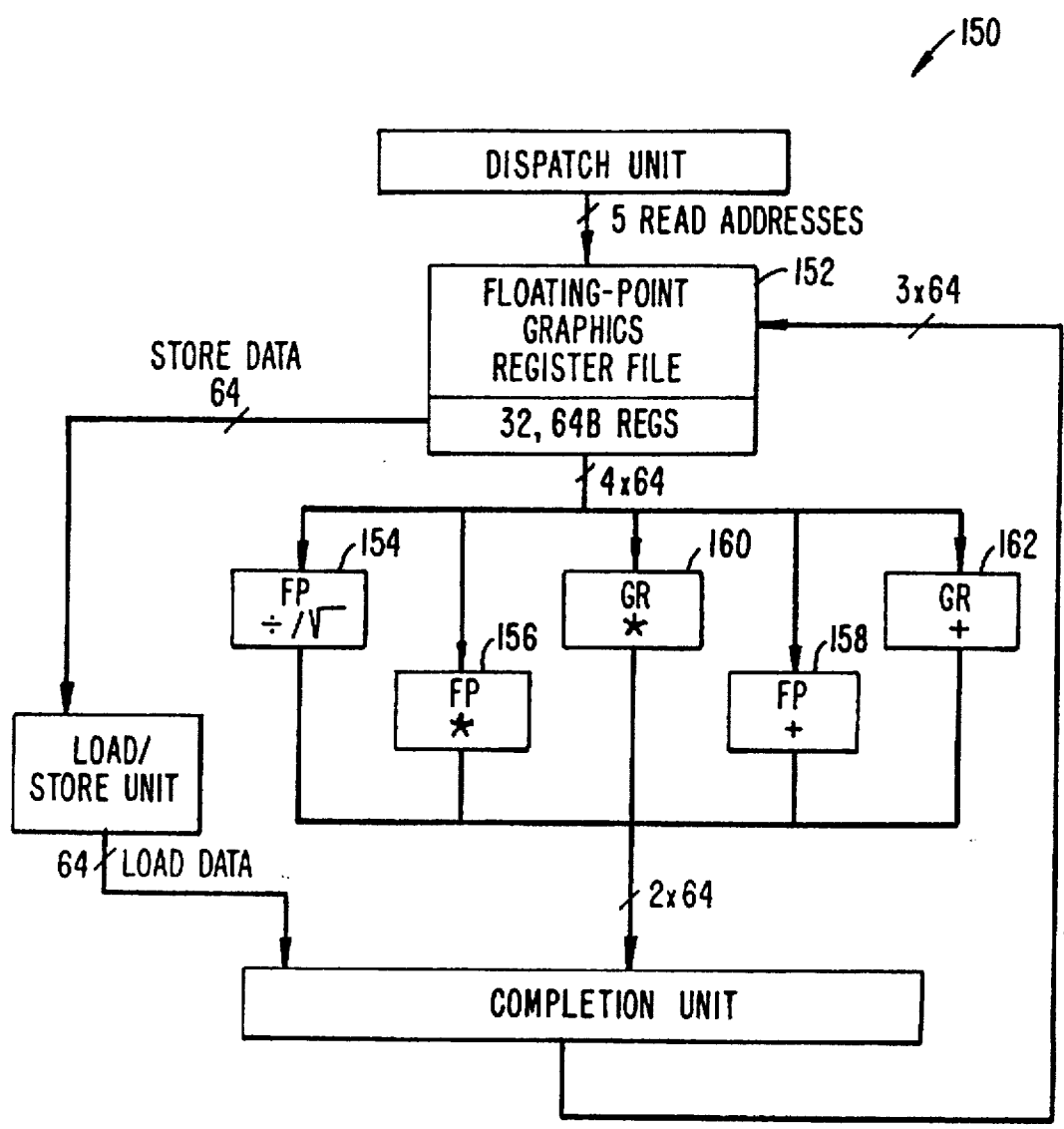
FIG. 4 shows a block diagram of the Floating Point/Graphics Unit.

FIG. 4 shows a block diagram of the Floating Point/ Graphics Unit. FGU 150 includes a Register File 152 and five functional units which may operate in parallel. The Register File incorporates 32 64-bit registers. Three of the functional units are a floating point divider 154, a floating point multiplier 156, and a floating point adder 158. The floating point units perform all the floating point operations. The remaining two functional units are a graphics multiplier (GRM) 160 and a graphics adder (GRA) 162. The graphical units perform all the graphics operations of the Visual Instruction Set (VIS) instructions.

The VIS instructions are machine code extensions that allow for enhanced graphics capabilities. The VIS instructions typically operate on partitioned data formats. In a partitioned data format, 32 and 64-bit words include multiple word components. For example, a 32-bit word may be composed of four unsigned bytes and each byte may represent a pixel intensity value of an image. As another example, a 64-bit word may be composed of four signed 16-bit words and each 16-bit word may represent the result of a partitioned multiplication.

The VIS instructions allow the microprocessor to operate on multiple pixels or bands in parallel. The GRA performs single cycle partitioned add and subtract, data alignment, merge, expand and logical operations. The GRM performs three cycle partitioned multiplication, compare, pack and pixel distance operations. The following is a description of some these operations that may be utilized with the present invention.

Figure 5:
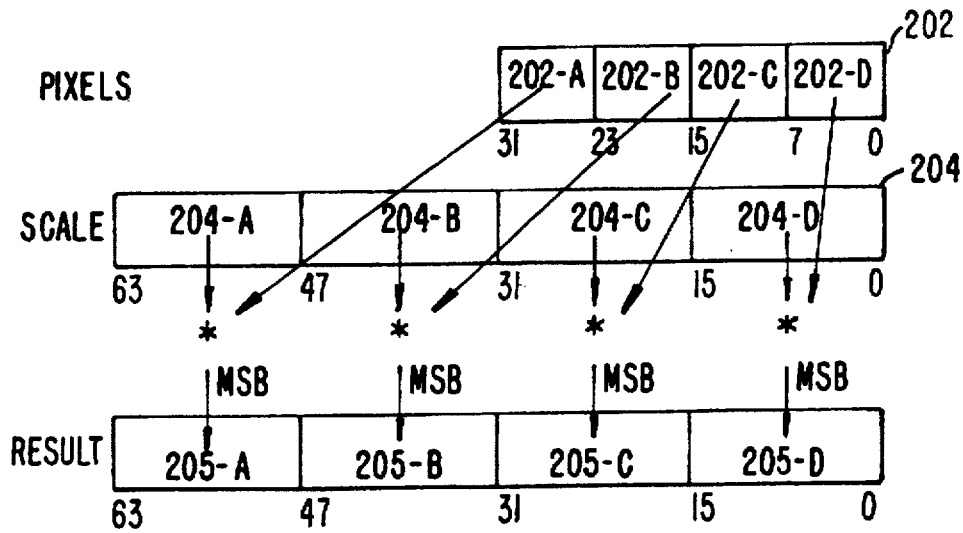
FIG. 5 is a flow diagram of a partitioned multiply instruction.

FIG. 5 is a flow diagram of a partitioned multiply operation. Each unsigned 8-bit component (i.e., a pixel) 202A–D held in a first register 202 is multiplied by a corresponding (signed) 16-bit fixed point integer component 204A–D held in a second register 204 to generate a 24-bit product. The upper 16 bits of the resulting product are stored as corresponding 16-bit result components 205A–D in a result register 206.

Figure 6:
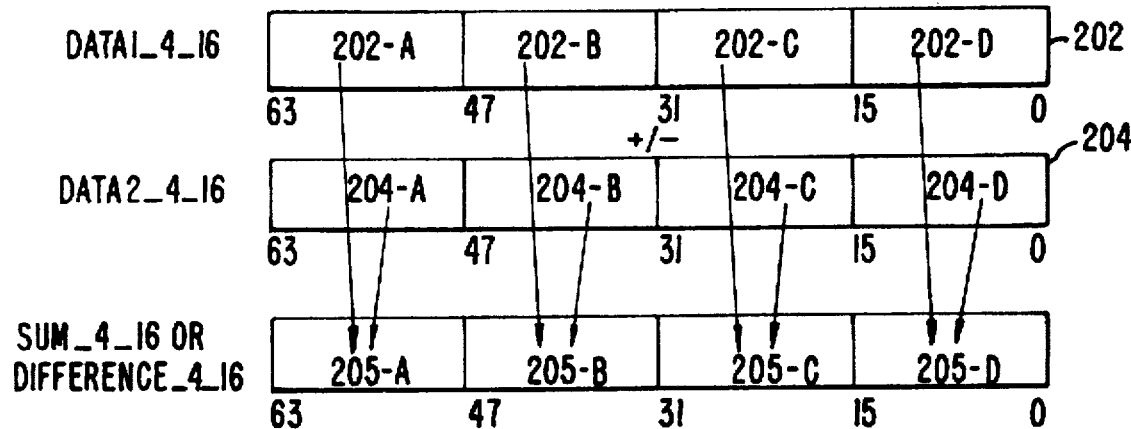
FIG. 6 is a flow diagram of a partitioned add instruction.

FIG. 6 is a flow diagram of a partitioned add/subtract operation. Each 16-bit signed component 202A–D held in the first register 202 is added/subtracted to a corresponding 16-bit signed component 204A–D held in the second register to form a resulting 16-bit sum/difference component which is stored as a corresponding result component 205A–D in a result register 205.

Figure 7A:
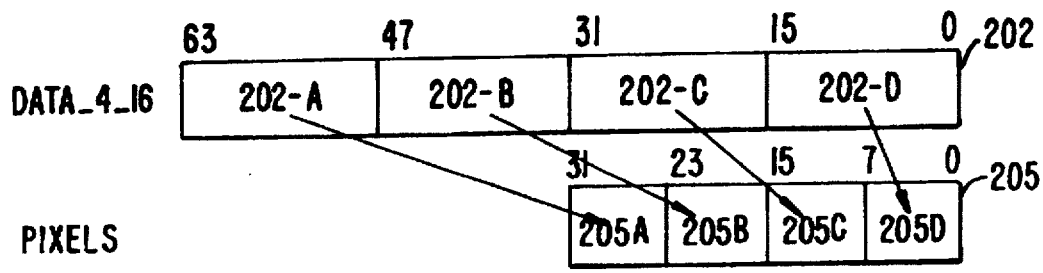
FIGS. 7A–C are a flow diagrams of a partitioned pack instruction.
Figure 7B:
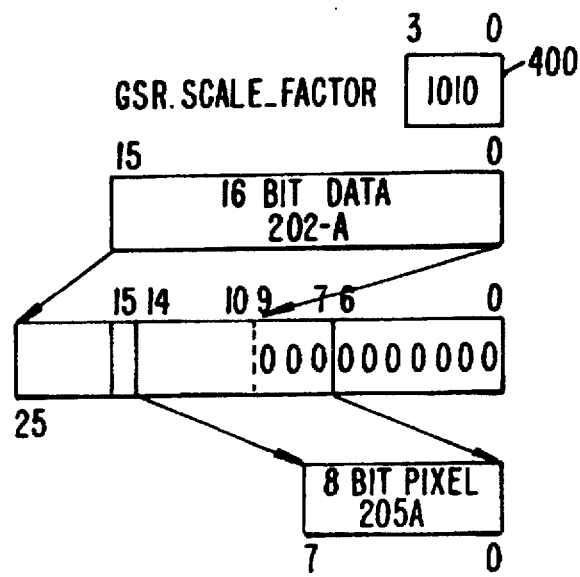
Figure 7C:
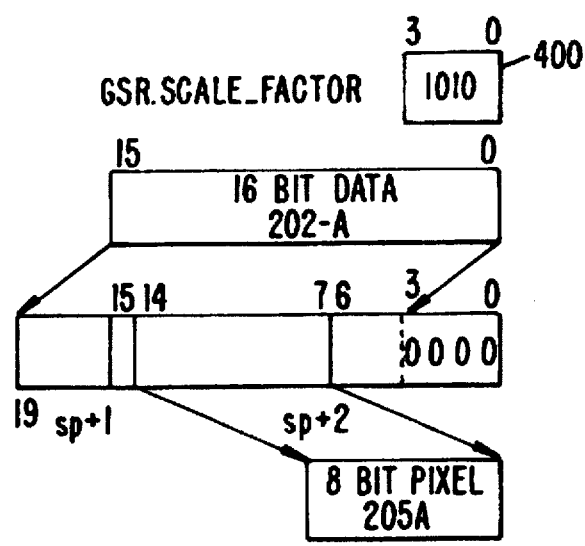
Figure 8A:
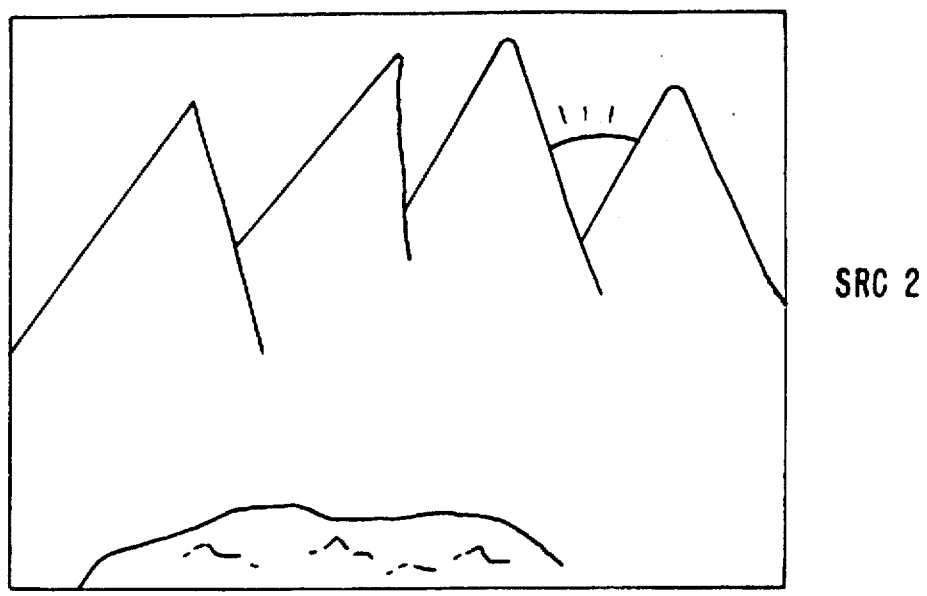
FIGS. 8A–D are depictions of source, destination, and control images.
Figure 8B:
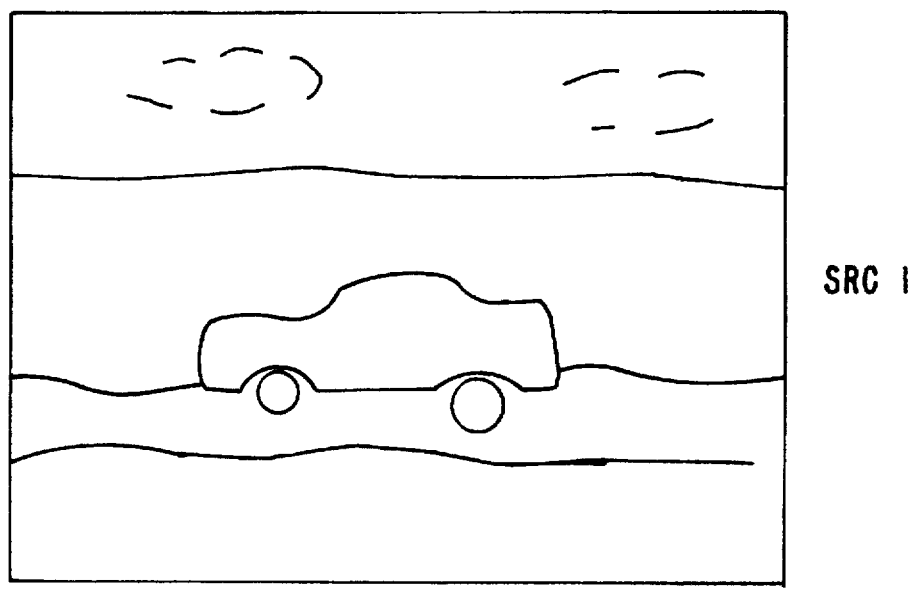
Figure 8C:
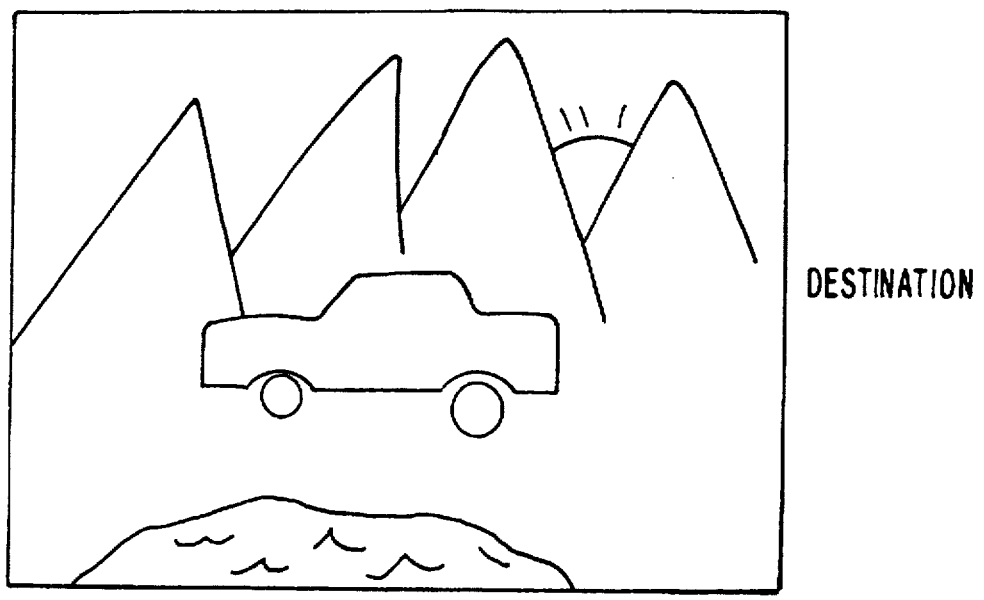
Figure 8D:
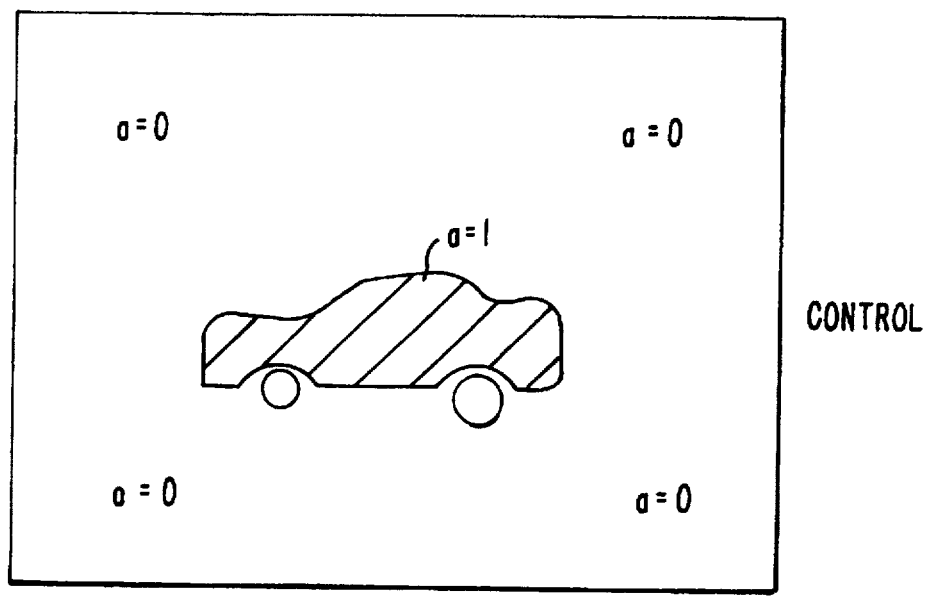

FIG. 7 is a flow diagram of a partitioned pack operation. Each 16-bit fixed value component 202A–D held in a first register 202 is scaled, truncated and clipped into an 8-bit unsigned integer component which is stored as a corresponding result component 205A–D in a result register 205. This operation is depicted in greater detail in FIGS. 7B–C.

Referring to FIG. 7B, a 16-bit fixed value component 202A is left shifted by the bits specified by a GSR scale factor held in GSR register 400 (in this example the GSR scale factor 10) while maintaining clipping information. Next, the shifted component is truncated and clipped to an 8-bit unsigned integer starting at the bit immediately to the left of the implicit binary point (i.e., between bits 7 and 6 for each 16-bit word). Truncation is performed to convert the scaled value into a signed integer (i.e., round to negative infinity). FIG. 7C depicts an example with the GSR scale factor equal to 8.

ALPHA BLENDING

Figure 9:
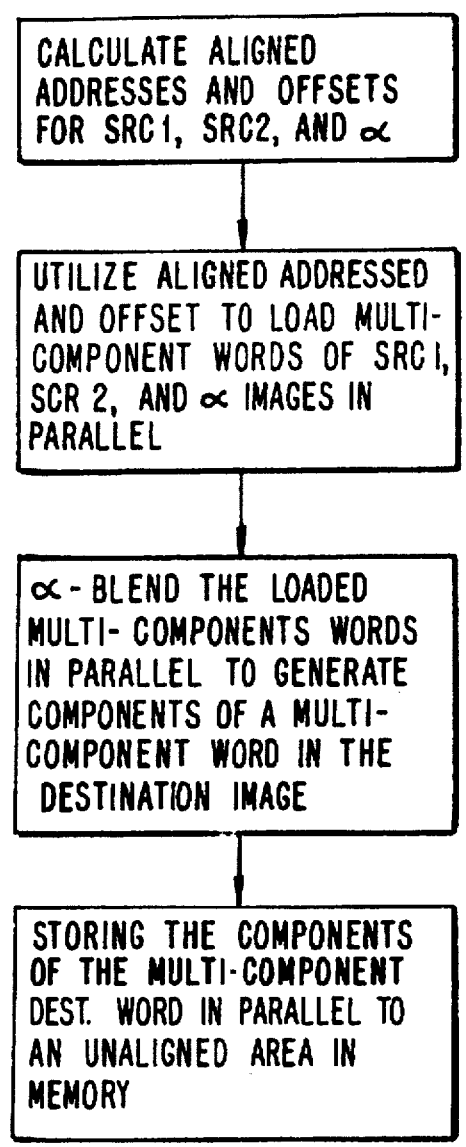
FIG. 9 is flow chart depicting a preferred embodiment of a method of alpha blending two images.

FIG. 9 is a flow chart depicting a preferred embodiment of a method of alpha blending two images. In FIG. 9, multi-component words, with each component associated with a pixel value, are loaded from unaligned areas of memory holding the src1, src2, and control images. The components of these multi-component words are processed in parallel to generate components of a multi-component word holding pixel values of the destination image. The components of a destination word are stored in parallel to an unaligned area of memory.

Accordingly, except for doing different arithmetic as dictated by specified precision values and definitions of partitioned operations, each of the routines described below, for each line of pixels, loops through the data by doing, load data, align data, perform arithmetic in parallel, before end after the loop, deal with edges.

Loading Misaligned Image Data

The use of the visual instruction set to load the src1, src2, and alpha images into the registers of the GPU will now be described. For purpose of illustration it is assumed that the src1 image data begins at Address 16005, src2 begins at Address 24003, and dst begins at 8001. Accordingly, neither src1, src2, or dst begins on an aligned byte address. In this example, all images are assumed to comprise 8-bit pixels and have only a single band.

For purposes of explanation the VIS assembly instructions are used in function call notation. This implies that memory locations instead of registers are referenced, hence aligned loads will implied rather than explicitly stated. This notation is routinely used by those skilled in the art and is not ambiguous.

The special visual instructions utilized to load the misaligned data are alignaddr(addr, offset) and falingndata (data_hi.data_lo). The function and syntax of these instructions is fully described in Appendix B. The use of these instructions in an exemplary subroutine for loading misaligned data will be described below.

The function of the alignaddr( ) instruction is to return an aligned address equal to the nearest aligned address occurring before the address of misaligned address and write the offset of the misaligned address from the returned address to the GSR. The integer in the offset argument is added to the offset of the misaligned address prior to writing the offset to the GSR.

For example, as stated above, if the starting Address for src1 is 16005, the alignaddr(6005,0) returns the aligned address of 16000 and writes 5 to the GSR.

The function of faligndata( ) is to load an 8-byte doubleword beginning at a misaligned address. This is accomplished by loading two consecutive double words having aligned addresses equal to data_hi and data_lo and using the offset written to the GSR to fetch 8 consecutive bytes with the first byte offset from the aligned boundary by the number written to the GSR.

If s1 is the address of the first byte of the first 64 bit word of the misaligned src1 data then the routine:

```
s1_aligned = alignaddr(s1, 0)

u_s1_0 = s1_aligned[1]

u_s1_1 = s1_aligned[2]

dbl_s1 = faligndata(u_s1_0, u_s1_1)
``` sets s1_aligned to the aligned address preceding the beginning to the first 64 bit word, i.e., 16000, sets u_s1_0 equal to the first word aligned address and u_s1_1 equal to the second word aligned address, i.e., 160000 and 16008, and returns the first misaligned word of src1 as dbl_s1.

This routine can be modified to return the misaligned pixels from src1, dbl_s2, and from the control image, quad_a, and included in a loop to load all the pixels of src1, src2, and the control image.

Calculating the Destination Image

1. Pixel Length of Src1, Src2, and Control Image is 1 Byte (8 bits)

In this example the pixels, α, in the control image are 8-bit unsigned integers having values between 0–255. Thus, Eq. 1 is transformed into:

$$dst = \alpha/256 * src1 + (1 - \alpha/256) * src2 \qquad \text{Eq. 2}$$

or the destination image can be calculated from:

$$dst = src2 + (src1 - src2) * \alpha/256 \qquad \text{Eq. 3}$$

The following routine utilizes visual instructions that provide for parallel processing of 4 pixel values per operation with each pixel comprising 8 bits. Additionally, as will become apparent, the routine eliminates the requirement of explicitly dividing by 256 thereby reducing the processing time and resources required to calculate the pixel values in the destination image.

ROUTINE 2 dbl_s1_e = fexpand(read_hi(dbl_s1));

dbl_s2_e = fexpand(read_hi(dbl_s2));

dbl_tmp2 = fsub16(dble_s2_e, dbl_s1_e);

dbl_tmp1 = fmul8 × 16(read_hi(quad_a) , dbl_tmp_2);

dbl_sum1 = fpadd16(dbl_s1_e, dbl_tmp1);

dbl_s1_e = fexpand(read_lo(dbl_s1));

dbl_s2_e = fexpand(read_lo(dbl_s2));

dbl_tmp2 = fsub16(dble_s2_e, dbl_s1_e);

dbl_tmp1 = fmul8 × 16(read_lo(quad_a) , dbl_tmp_2);

dbl_sum2 = fpadd16(dbl_s1_e, dbl_tmp1);

dbl_d = freg_pair(fpack16(dbl_sum1, dbl_sum2)

The functions of the various instructions in routine 2 to calculate the pixel values in the destination image will now be described. The variables dbl_s1, dbl_s2, and quad_a are all 8-byte words including 8 pixel values. As will be described more fully above, each byte may be a complete pixel value or a band in a multiple band pixel.

FIG. 10 depicts the modifications to the word components for each operation in the routine. As depicted in FIG. 10, the function of fexpand(read_hi(dbl_s1) is to expand the upper 4-bytes of dbl_s1 into a 64 bit word having 4 16-bit partitions to form dbl_s1_e. Each 16-bit partition includes 4 leading 0's, the a corresponding byte from dbl_s1 and 4 trailing 0's. The variable dbl_s2_e used to calculate dbl-sum1 is similarly formed and the variables dbl_s1_e and dbl_s2_e used to calculate dbl_sum2 are formed by expanding the lower 4 bytes of the corresponding variables.

The function of fsub16(dbl_s2_, dbl_s1_e) is to calculate the value (src2-src1). This instruction performs partitioned subtraction on the 4 16-bit components of dbl_s2 and dbl_s1 to form dbl_tmp2.

The function of fmul8×16(read_hi(quad_a, dbl_tmp2)) is to calculate the value α/256*(src2-src1). This instruction performs partitioned multiplication of the upper 4 bytes of quad_a and the 4 16-bit components of dbl_tmp2 to form a 24-bit result and truncates the lower 8 bits to form a 16 bit result. Note that the upper 4 bits of each 16 bit component of dbl-tap2 are 0's, because of the fexpand operation, the lower 4 bits of the 24 bit product are also 0's. The middle 16 bits are the result of multiplying the byte expanded from dbl-s1 and the corresponding byte from quad_a to form the product of α*(src2-src1). Thus, the truncation of the lower 8 bits removes the lower 4 0's, resulting from the previous expansion, and the lower 4 bits of the product to effect division by 256 to form dbl_tmp1 equal to α/256*(src2-src1).

The function of fpadd16(dbl_s1_e, dbl_tmp1) is to calculate α/256*(src2-src1)+src2. This instruction performs partitioned addition on the 16-bit components of its arguments.

The function of freg_pair(pack16(dbl_sum1, pack 16(dbl_sum2) is to return an 8-byte (64 bits) including 8 pixel values of the destination image. The instruction fpack16 packs each 16-bit component into a corresponding 8-bit component by left-shifting the 16-bit component by an amount specified in the GSR register and truncating to an 8-bit value. Thus, the left shift removes the 4 leading 0's and the lower bits are truncated to return the 8 significant bits of the destination in each of the 4 components. The function of freg-pair is to join the two packed 32 bit variables into a 64-bit variable.

2. Pixel Length of Src1, Src2, and Control Image is 16 bits

For 16 bits a second routine is utilized which takes into account different requirements of precision.

ROUTINE 2A dbl_halfshort = 0 × 80008000 dbl_mask_255 = 0 × 00ff00ff compute (1 − r)*s1 dbl_a = fsub16(dbl_a, dbl_halfshort);

(void)alignaddr(d_aligned, seven);

dbl_tmp1 = faligndat(dbl_mask_255, dbl_a);

dbl_tmp2 = fand(dbl_tmp1, dbl_mask_255);

flt_hi = fpack16(dbl_tmp2);

dbl_tmp2 = fmul8ul × 16(dbl_a, dbl_s1);

dbl_tmp1 = fmul8 × 16(flt_hi, dbl_s1);

dbl_sum2 = fpadd16(dbl_tmp1, dbl_tmp2);

dbl_sum1 = fpsub16(sbl_s1, dbl_sum2);

compute r*s2 dbl_tmp2 = fmul8ul × 16(dbl_a, dbl_s2);

dbl_tmp1 = fmul8 × 16(flt_hi_a, dbl_s2);

dbl_sum2 = fpadd(dbl_tmp1, dbl_tmp2);

dbl_d = fpadd16(dbl_sum1, dbl_sum2);

Except for fmul8ul×16 and fand the operations in routine 2A are the same as in routine 2 modified to operate on 16 bit components. The description of the functions of those operations will not be repeated.

The function of fmul8ul×16(dbl_a, dbl_s2) is to perform it to perform a partitioned multiplication the unsigned lower 8 bits of each 16-bit component in the arguments and return the upper 16 bits of the result for each component as 16-bit components of dbl-tmp2.

The function of fand(dbl__tmp1, dbl__mask__255) is to perform a logical AND operation on the variables defined by the arguments.

Storing the Misaligned Destination Image Data

1. Loading Utilizing an Edge Mask and Partial Instruction

The following routine calculates an edge mask and utilizes a partial store operation to store the destination image data where d is a pointer to the destination location, d_aligned is the aligned address which immediately precedes d, and width is the width of a destination word.

ROUTINE 3 d_end = d + width − 1;

emask = edge_8(d, d_end);

pst_8(dbl_d, (void*) d_aligned, emask);

++d_aligned;

emask = edge8(d_aligned, d_end);

The function of emask is to generate a mask for storing unaligned data. For example, if the destination data is to be written to address 0×10003, and the previous aligned address in 0×10000, then the emask will be [00011111] and the pst instruction will start writing at address 0×10000 and emask will disable writes to 0×10000, 0×10001, and 0×10002 and enable writes to 0×10003–0×10007. Similarly, after emask is incremented the last part of dbl_d is written to the 0×10008, 0×10009, and 0×1000A and the addresses 0×1000B–0×1000F will be masked.

What is claimed is:

1. In a computer system, a method of alpha blending images, comprising the steps of:
   loading a first word, comprising a plurality of ordered pixel1 word components into a processor in parallel each pixel1 word component associated with a source1 pixel of a first source image;
   loading a second word comprising plurality of ordered pixel2 word components into a processor in parallel, each pixel2 word component associated with a source2 pixel of a second source image;
   loading a third word comprising plurality of ordered independent control word components into a processor in parallel, each control word component associated with a control pixel of a control image;
   alpha blending the components of said first, second, and third words in parallel to generate ordered word components of a fourth word, with the word components of said fourth word associated with the destination pixels of an alpha blended destination word, with said alpha blending step including the step of forming, in parallel, the product of each ordered independent control word component in said third word with corresponding ordered pixel1 and pixel2 components of said first and second words;
   storing the word components of said fourth word to an unaligned area of a memory in parallel.

2. In a computer system, a method of alpha blending images comprising:
   loading a first word, comprising a plurality of word components into a processor in parallel, each word component associated with a source1 pixel of a first source image;
   loading a second word comprising plurality of word components into a processor in parallel, each word component associated with a source2 pixel of a second source image;
   loading a third word comprising plurality of word components into a processor in parallel, each word component associated with a control pixel of a control image;
   alpha blending the components of said first, second and third words in parallel to generate word components of a fourth, with the word components of said fourth word associated with the destination pixels of an alpha blended destination word;
   storing the word components of said fourth word to an unaligned area of a memory in parallel;
   said step of alpha blending comprises the step of arithmetically combining corresponding source1, source2, and control pixels according to a predetermined formula to generate a corresponding destination pixel;
   specifying a precision value for each of said source1, source2, control, and destination pixels;
   reordering operations and terms of said predetermined formula to achieve the precision value and increase efficiency of said alpha blending step.

3. The method of claim 2 wherein:
   said step of arithmetically combining utilizes predefined partitioned add, multiply, and subtract operations to operate on components of said first, second, and third words in parallel;
   reordering operations and terms of said predetermined formula to increase the efficiency of operation of said predetermined partitioned operations.

4. In a computer system, a method of blending first and second source images to generate a destination image utilizing a control image, where any one of said image is an unaligned image stored in a memory having boundaries unaligned with the addresses of said memory and where said images comprise pixel words including multiple pixel word components, and with each pixel word component in said images comprising a fixed number of bits, said method comprising the steps of:
   loading a first word from said first and second source images and said control image, and, if one of said images is an unaligned image;
   generating an aligned address immediately preceding an unaligned address of a first word in said unaligned image;
   calculating an offset being the difference between said aligned address and said unaligned address;
   utilizing said unaligned address and said offset to load a word from said unaligned image;
   expanding a subset of the pixels in a each pixel word component a loaded first word of said first and second source images into expanded pixel word components having equal numbers of leading and trailing zeros to form an expanded first word including said fixed number of pixels;
   performing a partitioned subtraction operation to subtract corresponding expanded pixel word components in said first expanded words of said first and second source images to form an expanded difference word including expanded difference components;

performing a partitioned multiplication of each corresponding pixel word components in said first word of said control image and each corresponding expanded difference pixel word component of said expanded difference word to form expanded product word components of an expanded product word with each expanded product word component including the same number of leading zeros as said expanded pixel and having said fixed number of least significant bits truncated to effect division by 2 raised to the power of said fixed number;

performing a partitioned sum of said expanded product word and said first expanded word first source image to form a first expanded halfword of said destination image comprising expanded destination components;

packing said destination components of said expanded halfword to form a subset of the pixel word components of said destination word.

5. In a computer system, a method of blending first and second source images to generate a destination image utilizing a control image, where any one of said images is an unaligned image stored in a memory having boundaries unaligned with the addresses of said memory and where said images comprise pixel words including multiple pixel word components, and with each pixel word component in said images comprising a fixed number of bits, said method comprising the steps of:

forming a packed control pixel word, having packed control word components of half the fixed number of bits, with said packed control pixel word components including the upper half of the bits in said control image word components;

performing a partitioned multiplication of each packed control word component in said packed control word, being an upper half of each control image pixel word component, and a corresponding word component in said first image pixel word to form a first product word including first product word components having the fixed number of bits by truncating half the fixed number lower bits of each first product word component;

performing a partitioned half multiplication of said packed control pixel word and said first image pixel word to multiply a lower half of each control image pixel word component and the corresponding word components of said first image pixel word to form a second product word including second product word components having the fixed number of bits by truncating the half the fixed number of lower bits of each second product word component;

performing a partitioned addition of the word components of said first and second product words to form a first sum image word having first sum word components of high precision due to the truncation of only half the fixed number of bits from the first and second product word components;

performing a partitioned multiplication of each packed control word component in said packed control word and a corresponding word component in said second image pixel word to form a third product word including third product word components having the fixed number of bits by truncating half the fixed number lower bits of each first product word component;

performing a partitioned half multiplication of said packed control pixel word and said second image pixel word to multiply a lower half of each control image pixel word component and the corresponding word components of said second image pixel word to form a fourth product word including fourth product word components having the fixed number of bits by truncating the half the fixed number of lower bits of each second product word component;

performing a partitioned addition of the word components of said third and fourth product words to form a second sum image word having first sum word components of high precision due to the truncation of only half the fixed number of bits from the third and fourth product word components;

performing a partitioned subtraction operation of the word components of said first and second image words to form a destination image pixel word performing a partitioned add operation on said first and second resulting product words to form a first sum word;

performing a partitioned multiplication of said first word of said control image and said first word of said second source image to form a first resulting product word;

performing a partitioned multiplication of said packed logical result word said first word of said second source image to form a fourth resulting product word;

performing a partitioned add operation on said third and fourth resulting product words to form a second sum word;

performing a partitioned add operation of said first and second sum words to form said first destination word;

computing an edge mask to store said destination word to said unaligned destination image;

utilizing said edge mask to perform a partial store of said destination word to said unaligned destination image.

6. A computer program product comprising:

a computer usable medium having computer readable code embodied therein for causing alpha blending of two images, the computer program product comprising:

computer readable code devices configured to effect loading a first word, comprising a plurality of ordered pixel1 word components into a processor in parallel, each pixel1 word component associated with a source1 pixel of a first source image;

computer readable code devices configured to effect loading a second word comprising plurality of ordered pixel2 word components into a processor in parallel, each pixel2 word component associated with a source2 pixel of a second source image;

computer readable code devices configured to effect loading a third word comprising plurality of ordered independent control word components into a processor in parallel, each control word component associated with a control pixel of a control image;

computer readable code devices configured to effect alpha blending the components of said first, second, and third words in parallel to generate ordered word components of a fourth word, with the word components of said fourth word associated with the destination pixels of an alpha blended destination word, with said alpha blending step including the step of forming, in parallel, the product of each ordered independent control word component in said third word with corresponding ordered pixel1 and pixel2 components of said first and second words;

computer readable code devices configured to effect storing the word components of said fourth word to an unaligned area of a memory in parallel.

7. A computer program product comprising:
a computer usable medium having computer readable code embodied therein for causing blending first and second source images to generate a destination image utilizing a control image, where any one of said images is an unaligned image stored in a memory having boundaries unaligned with the addresses of said memory and where said images comprise pixel words including multiple pixel word components, and with each pixel word component in said images comprising a fixed number of bits, said the computer program product comprising:

computer readable code devices configured to effect loading a first word from said first and second source images and said control image, and, if one of said images is an unaligned image;

computer readable code devices configured to effect generating an aligned address immediately preceding an unaligned address of a first word in said unaligned image;

computer readable code devices configured to effect calculating an offset being the difference between said aligned address and said unaligned address;

computer readable code devices configured to effect utilizing said unaligned address and said offset to load a word from said unaligned image;

computer readable code devices configured to effect expanding a subset of the pixels in a each pixel word component a loaded first word of said first and second source images into expanded pixel word components having equal numbers of leading and trailing zeros to form an expanded first word including said fixed number of pixels;

computer readable code devices configured to effect performing a partitioned subtraction operation to subtract corresponding expanded pixel word components in said first expanded words of said first and second source images to form an expanded difference word including expanded difference components;

computer readable code devices configured to effect performing a partitioned multiplication of each corresponding pixel word components in said first word of said control image and each corresponding expanded difference pixel word component of said expanded difference word to form expanded product word components of an expanded product word, with each expanded product word component including the same number of leading zeros as said expanded pixel and having said fixed number of least significant bits truncated to effect division by 2 raised to the power of said fixed number;

computer readable code devices configured to effect performing a partitioned sum of said expanded product word and said first expanded word first source image to form a first expanded halfword of said destination image comprising expanded destination components;

computer readable code devices configured to effect packing said destination components of said expanded half-word to form a subset of the pixel word components of said destination word.

8. A computer program product comprising:
a computer usable medium having computer readable code embodied therein for causing blending first and second source images to generate a destination image utilizing a control image, where any one of said images is an unaligned image stored in a memory having boundaries unaligned with the addresses of said memory and where said images comprise pixel words including multiple pixel word components, and with each pixel word component in said images comprising a fixed number of bits, the computer program product comprising:

forming a packed control pixel word, having packed control word components of half the fixed number of bits, with said packed control pixel word components including the upper half of the bits in said control image word components;

performing a partitioned multiplication of each packed control word component in said packed control word, being an upper half of each control image pixel word component, and a corresponding word component in said first image pixel word to form a first product word including first product word components having the fixed number of bits by truncating half the fixed number lower bits of each first product word component;

performing a partitioned half multiplication of said packed control pixel word and said first image pixel word to multiply a lower half of each control image pixel word component and the corresponding word components of said first image pixel word to form a second product word including second product word components having the fixed number of bits by truncating the half the fixed number of lower bits of each second product word component;

performing a partitioned addition of the word components of said first and second product words to form a first sum image word having first sum word components of high precision due to the truncation of only half the fixed number of bits from the first and second product word components;

performing a partitioned multiplication of each packed control word component in said packed control word and a corresponding word component in said second image pixel word to form a third product word including third product word components having the fixed number of bits by truncating half the fixed number lower bits of each first product word component;

performing a partitioned half multiplication of said packed control pixel word and said second image pixel word to multiply a lower half of each control image pixel word component and the corresponding word components of said second image pixel word to form a fourth product word including fourth product word components having the fixed number of bits by truncating the half the fixed number of lower bits of each second product word component;

performing a partitioned addition of the word components of said third and fourth product words to form a second sum image word having first sum word components of high precision due to the truncation of only half the fixed number of bits from the third and fourth product word components;

performing a partitioned subtraction operation of the word components of said first and second image words to form a destination image pixel word.

* * * * *

UNITED STATES PATENT AND TRADEMARK OFFICE
CERTIFICATE OF CORRECTION

PATENT NO.    : 5,767,867

DATED         : June 16, 1998

INVENTOR(S)   : Xiao Ping HU

It is certified that error appears in the above-identified patent and that said Letters Patent is hereby corrected as shown below:

In column 9 at line 43, after "comprising" insert --a--.
In column 9 at line 47, after "comprising" insert --a--.
In column 9 at line 60, after "words;" insert --and--.
In column 10 at line 3, after "comprising" insert --a--.
In column 10 at line 7, after "comprising" insert --a--.
In column 10 at line 13, after "fourth" insert --word--.
In column 10 at line 15, after "word;" insert --and--
In column 10 at line 17, after "parallel;" insert --wherein--.
In column 10 at line 18, delete "step" (2nd occurrence) should read --steps--
In column 10 at line 24, after "pixels;" insert --and--.
In column 10 at line 33, after "parallel;" insert --and--.
In column 10 at line 39, delete "image" (2nd occurrence) should read --images--
In column 10 at line 58, after "component" insert --of--.
In column 11 at line 15, after "components;" insert --and--.
In column 12 at line 14, after "word" insert --;--.
In column 12 at line 31, after "image;" insert --and--.
In column 12 at line 44, after "comprising" insert --a--.
In column 12 at line 50, after "comprising" insert --a--.
In column 12 at line 64, after "words;" insert --and--.
In column 13 at line 30, after "component" insert --of--.
In column 13 at line 58, after "components;" insert --and--.

UNITED STATES PATENT AND TRADEMARK OFFICE
CERTIFICATE OF CORRECTION

PATENT NO.   : 5,767,867
DATED        : June 16, 1998
INVENTOR(S)  : Xiao Ping HU It is certified that error appears in the above-indentified patent and that said Letters Patent is hereby corrected as shown below:

Column 14, line 60, after "components;" insert --and--

Signed and Sealed this

Fifth Day of October, 1999

Q. TODD DICKINSON

*Attest:*

*Attesting Officer*          Acting Commissioner of Patents and Trademarks